United States Patent Office 3,520,637
Patented July 14, 1970

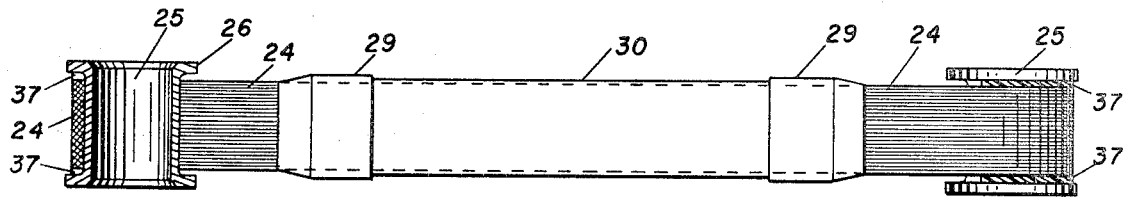
Fig. 3
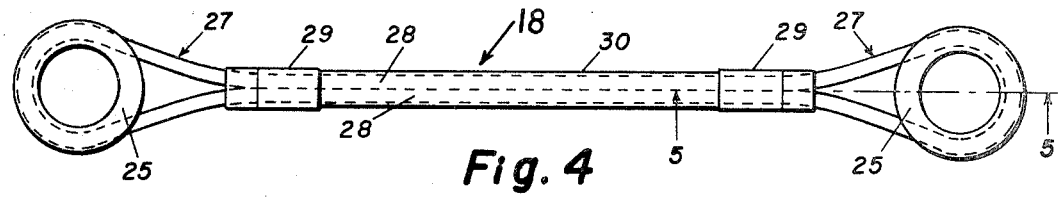
Fig. 4
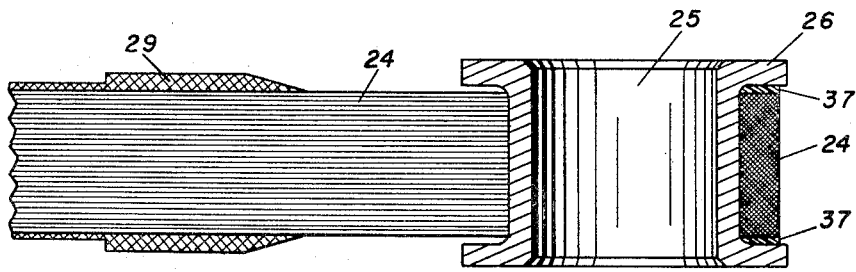
Fig. 5
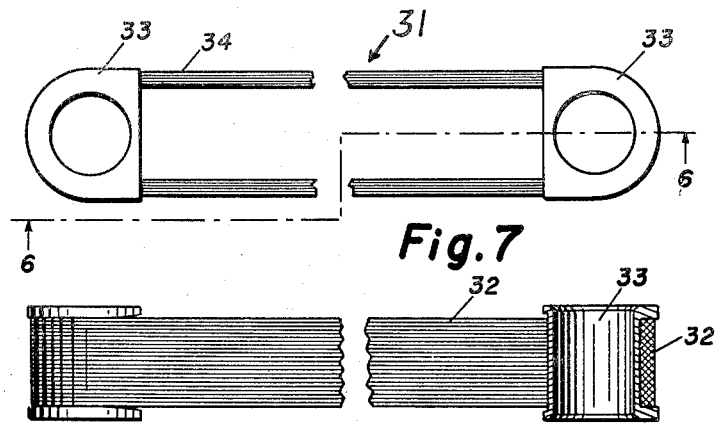
Fig. 7
Fig. 6
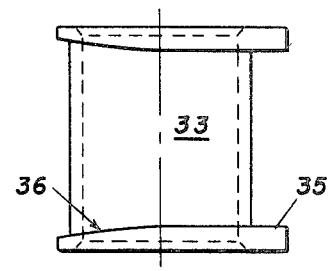
Fig. 8
HARRY TOBEY
INVENTOR.
BY Frank C. Leach jr.
ATTORNEY

---

3,520,637
TORSION-TENSION COUPLING
Harry Tobey, Havertown, Pa., assignor to The Boeing Company, Seattle, Wash., a corporation of Delaware
Continuation of application Ser. No. 172,902, Feb. 13, 1962. This application July 24, 1969, Ser. No. 849,565
Int. Cl. B63h 1/08; B64c 27/32
U.S. Cl. 416—135                                    2 Claims

ABSTRACT OF THE DISCLOSURE

This invention relates to a torsion-tension strap for retaining the rotor blade to the rotor hub of a helicopter or a structure under similar combined torsion and tension, wherein the torsion-tension strap is made of coated wire filaments wound around two end fittings to form a strap having side portions and where the side portions of the strap are wrapped over a portion of the length thereof and transverse to the longitudinal centerline of said strap to hold the center portions in parallel and contiguous relationship.

---

This is a continuation of application Ser. No. 172,902 filed Feb. 13, 1962.

This invention relates to a coupling capable of absorbing both torsional motions and tension forces and, more particularly, to a coupling for connecting the rotor blade of a helicopter to the rotor hub with the coupling absorbing both the torsional motions created by the twisting of the blade with respect to the hub and the centrifugal forces created by rotation of the blade about its hub.

In a helicopter, the articulated rotor blade is connected to its hub so that the blade oscillates with respect to the hub. Thus, the connection between the blade and the hub must be capable of absorbing these twisting motions created by such oscillations. Furthermore, due to the rotation of the rotor blade, the coupling between the hub and the rotor blade is subjected to a centrifugal force created by the rotation of the rotor blade.

One means of connecting the articulated rotor blade to its hub to permit such movements has been by the use of a coupling known as a tension-torsion strap, which is made of a plurality of stacked plates. However, these stacked plates, which are preferably slotted metal strips, add undesirable weight to the helicopter to therefore reduce its payload. Furthermore, these plates are difficult to manufacture into a unitary assembly.

Another problem with a tension-torsion strap, which is made of slotted metal strips, is associated with its length and torsional spring rate. If it is made relatively short to minimize weight and aerodynamic drag of its housing, it has a high torsional spring rate, which produces large control forces resulting from the cyclic twisting of the rotor blade. High spring rates also produce high internal stress levels and low fatigue lives. These difficulties are overcome by normally making the tension-torsion straps quite long; this imposes a penalty in weight, size of rotor mechanism, and rotor hub system aerodynamic drag.

The present invention satisfactorily solves these problems by employing a coupling of relatively light weight with a low torsional spring rate.

An object of this invention is to provide a coupling for absorbing both the torsional oscillations between two members and the tension forces created between the two members.

A further object of this invention is to provide a high tensile strength coupling for absorbing simultaneously the oscillating motions of the blade in a rotor system and the centrifugal forces created by the blade.

Another object of the invention is to provide a coupling of low torsional spring rate between two dynamic members of a rotating system whereby the coupling absorbs both the motions created by the steady or oscillating twisting of one of the members with respect to the other and centrifugal forces generated by rotation of the one member.

Other objects of the invention will be readily received from the following description.

This invention relates to a coupling between two members for absorbing the motions created by the twisting of one member with respect to the other member and the tensions forces created between the members. The coupling includes a strip of wires held together by an adhesive substance with each of the wires having a substantially small cross section and high tensile strength. The strip of wires is continuously wrapped to provide a plurality of layers of wires in contiguous relationship formed in the shape of a closed loop having opposed curved end portions and side portions connecting the opposed end portions. One of the opposed end portions is adapted to be secured to the one member and the other of the opposed end portions is adapted to be secured to the other member.

The attached drawings illustrate a preferred embodiment of the invention, in which FIG. 1 is a top plan view, partly in section, of a portion of a helicopter rotor blade and its hub including the coupling of the present invention;

FIG. 3 is a top plan view, partly in section, of one embodiment of the coupling of the present invention;

FIG. 4 is a side elevational view of the coupling of FIG. 3;

FIG. 5 is an enlarged view of a portion of the coupling of FIG. 3 showing the details of the bushing;

FIG. 6 is a top plan view, partly in section, of another form of the coupling of the present invention;

FIG. 7 is a side elevational view of the coupling of FIG. 6; and

FIG. 8 is an enlarged view of the bushing of FIGS. 6 and 7.

Figure 1:
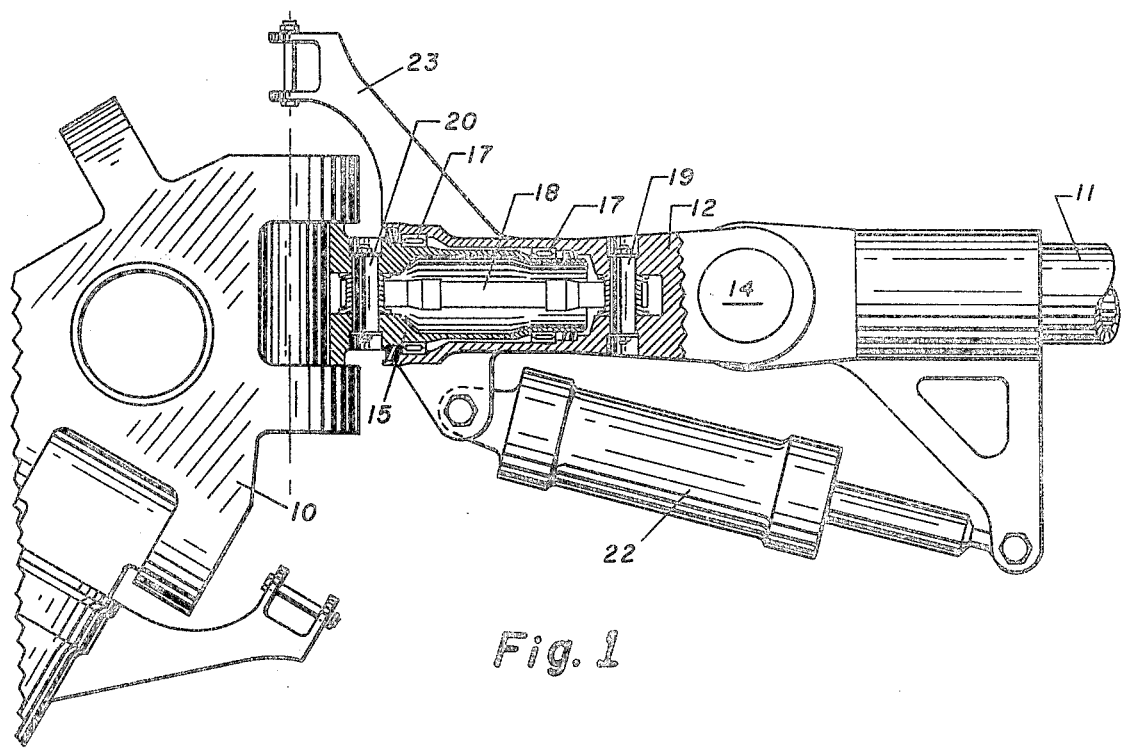
Figure 2:
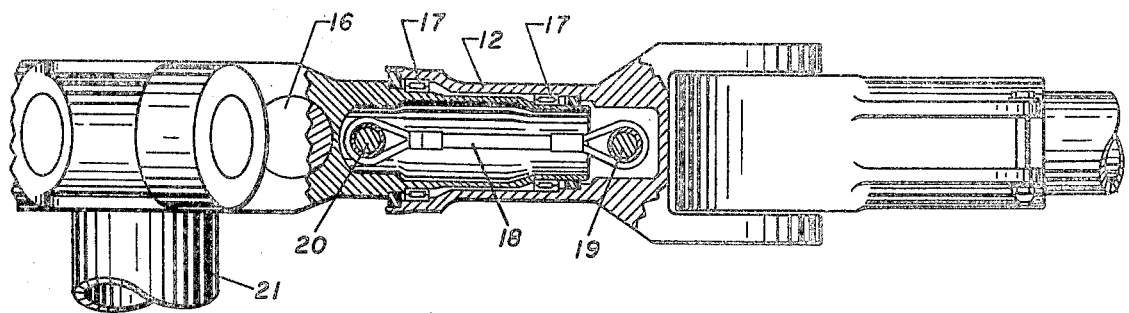
FIG. 2 is a side elevational view, partly in section, of a portion of the structure of FIG. 1.

Referring to the drawings and particularly to FIG. 1, there is shown a portion of a rotor hub 10 and a portion of a rotor blade 11. The blade 11 is pivotally connected to a pitch housing 12 by a vertical pin 14 whereby the blade 11 oscillates about the vertical pin 14.

The pitch housing 12 is mounted on bearings 17 on a pitch shaft 15, which is disposed within the pitch housing 12. This permits the pitch housing 12 to rotate or oscillate about the pitch shaft 15, which has one end connected to the rotor hub 10 by a horizontal pin 16.

The pitch housing 12 is connected to the pitch shaft 15 by a coupling 18. One end of the coupling 18 is attached to a pin 19, which is secured to the pitch housing 12. The other end of the coupling 18 is attached to a pin 20, which is secured to the pitch shaft 15. Thus, there is a unitary connection between the pitch shaft 15 and the pitch housing 12 through the coupling 18 and the pins 19 and 20.

The coupling 18 must be designed to permit the pitch housing 12 to oscillate about the pitch shaft 15 on the bearings 17. At the same time, the coupling 18 must be capable of absorbing the tension forces applied thereto due to the centrifugal forces created by rotation of the blade 11 about the rotor hub 10, which is driven by a rotor drive shaft 21.

The lead-lag movement of the blade 11 about its vertical hinge 14 is dampened by a damper 22, which is connected between the blade 11 and the pitch housing 12. A pitch arm 23 is connected to the pitch housing 12 to change the pitch of the blade 11. It should be understood that the pitch arm 23 is connected by suitable mechanism to a swash plate.

As shown in FIGS. 3 and 4, the coupling 18 is preferably formed of a plurality of wires 24, which may be considered a strip of wires. Each of these wires is of substantially small cross section and high tensile strength. The wires may be either round, rectangular, or modified rectangular in cross sections. For example, each of the wires 24 might have a round cross sectional shape with a diameter of .005". The tensile strength of each wire 24 is preferably about 500,000 pounds per square inch.

The strip of wires 24 is bonded or held together by a flexible adhesive substance such as a resin or an elastomer, for example. The adhesive substance might be polyurethane; one such polyurethane is sold by E. I. du Pont de Nemours & Co. under the trademark "Adiprene L." The adhesive substance holds the strip of wires in a tight bonded relationship while its flexibility does not contribute excessively to the torsional spring rate of the unit.

The use of an adhesive substance to bond the wires 24 together results in the load being evenly distributed because the adhesive provides shear continuity between the wires. The adhesive substance also compensates for broken or imperfect wires that occur when a strip of wires is wound to the length, which is necessary, to produce the coupling.

One method of forming the coupling 18 is by holding the strip of wires 24 against a bushing 25. The bushing 25 is preferably a cylindrical member with flanges 26 on each end thereof (see FIGS. 3 and 5). The strip of wires 24 is then extended for the desired length to a second bushing 25 and wrapped around this bushing and returned to the first bushing.

Thus, by continuing the process of winding the strip of wires 24 around the two bushings 25, there is formed a plurality of layers of the strip of wires 24. The number of layers, of course, depends upon the force to which the coupling will be subjected. Thus, as the maximum force to which the coupling is to be subjected increased, the number of layers must be increased.

If desired, the strip of wires may be formed from a single continuous wire 24 instead of a plurality of wires. In such an arrangement, it is necessary to wind the wire about the bushings 25 to form a layer before the next layer is started. It should be understood that the use of the term "strip of wires" in the claims include both the single continuous wire and the plurality of wires configurations and that each adjacent portion of the single continuous wire may be considered as a separate wire.

If the bushings 25 are to remain a part of the coupling and this is the preferable arrangement, then the strip of wires 24 is bonded to each of the bushings 25 by a suitable adhesive substance to form a unitary assembly. Because of the reaction between the bushing 25 and the wires 24, it is desirable to fill the space between the bushing 25 and the wires 24 with the adhesive substance as shown at 37 to prevent the wires from bulging into this area. As clearly shown in FIG. 4, the coupling 18 is in the form of a closed loop with opposed curved end portions 27 and connecting side portions 28.

The side portions 28 of the coupling 18 are held in parallel relationship by wrapping a strip of wires or other suitable material circumferentially around the side portions. This circumferential winding of wires must be sufficient to withstand any forces tending to separate the side portions 28 from each other. Since the greatest separating stresses on the side portions 28 will occur adjacent to the curve end portions 27, a greater number of layers of wire is wrapped around the side portions 28 adjacent to the end portions 27 as shown at 29. The center portion 30 of the wrapping of the layers of wire about side portions 28 has a smaller number of layers and such wrapping may be eliminated entirely, if desired.

For example, the center portion 30 of the wrapping might be four layers of the strip of wires whereas the thicker portions 29 might have fourteen layers. In such an arrangement, the number of layers forming the side portions 28 and the end portions 27 might be about fifty. It should be understood that the wires, which are wrapped around the side portions 28 of the coupling 18, are preferably of the same cross section and tensile strength as those used in forming the coupling 18.

The coupling 18 has one of its bushings 25 surrounding the pin 20 and held thereby to the pitch shaft 15. The other bushing 25 is disposed on the pin 19 and secured thereby to the pitch housing 12. As previously explained, the bushings 25 may be omitted, if desired, and the curved end portion 27 would then be mounted on the pins 19 and 20 to provide the same securing arrangement. However, for ease of assembly and manufacture, the use of the bushings 25 is preferable.

With the coupling 18 attached to the pitch shaft 15 and the pitch housing 12, it is seen that the coupling absorbs any oscillating motions of the housing 12 with respect to the shaft 15 due to the twisting of the blade 11 with respect to the hub 10. At the same time, the coupling 18 is subjected through the housing 12 to the centrifugal forces created by the blade 11 due to its rotation about its hub 10, which is being driven by the drive shaft 21.

Another embodiment of the coupling is shown at 31 in FIGS. 6 to 8. This coupling is formed of a trip of wires 32, which are the same as the wires 24 and may be either a single continuous wire or a plurality of wires. The strip of wires 32 is wound around bushings 33, which are preferably cylindrical members, in the same manner as that described with respect to the winding of the wires 24 about the bushings 25.

This results in a loop being formed but the side portions 34 of the loop are spaced from each other (see FIG. 7) and there is no wrapping of wires about the side portions to maintain them in their desired relation as in the coupling 18. Instead, the side portions 34 are maintained in a spaced parallel relationship by merely extending the side portions straight from the curved end portions.

However, in this arrangement, there is a greater movement of the side portions 34 when the coupling 31 is subject to a twisting motion. Thus, it is desirable to provide at least portions of inner walls of end flanges 35 of the bushings 33 with a taper as shown at 36 in FIG. 8. Accordingly, there is a divergent relationship between the inner walls of the end flanges 35 of the bushings 33. This controls the bending of the side portion 34 as it moves relative to the end flanges 35 of the bushings 33 when the coupling 31 is twisted. This arrangement also eliminates the need of any filling with an adhesive substance between the wires 32 and the bushings 33.

The coupling 31 is mounted on the pins 19 and 20 in the same manner as the coupling 18. Furthermore, if it is desired to eliminate the bushings 33, this also may be done.

In determining the size of the wires 24 or 32, which are used to form the coupling 18 or 31, as well as the width and thickness of the wire pack, they are selected so that the torsional spring rate of the coupling is low.

An advantage of the coupling because of its low torsional spring rate is that the control loads, which are used to actuate the rotor blades, may be smaller.

Another advantage of the present invention is that the weight of the coupling, which is used to join the rotor blade to its hub, is substantially reduced as compared with presently employed couplings, which are made of slotted metal strips. This is because the coupling has a higher tensile stress level due to the higher tensile strength of each wire; the tensile strength of each wire is the tensile strength of the coupling and a much higher tensile strength can be obtained from a small wire than a formed member, for example.

Still another advantage of a coupling with a strip of wires, as compared to a coupling made of slotted metal strips, is that it is much easier and cheaper to fabricate.

A further advantage of the coupling of the present invention is that it is a much safer flight item than couplings, which are presently employed. This is because the entire coupling does not fail when a single wire fails. Thus, periodic inspections will disclose the fatigue failure of a single wire prior to the coupling failing. In a single member of the same size, a fatigue failure will be of the entire coupling so that periodic inspections will not provide the same desired result.

For purposes of exemplification, particular embodiments of the invention have been shown and described according to the best present understanding thereof. However, it will be apparent that changes and modifications in the arrangement and construction of the parts thereof may be resorted to without departing from the true spirit and scope of the invention.

What is claimed is:

1. In a helicopter rotor system, a rotor hub and blade connection comprising:
    a rotor hub spindle;
    a rotor hub arm on said spindle;
    a bearing means between said spindle and said arm;
    a rotor blade;
    a first means to mount said hub to said rotor system;
    a second means to mount said arm to said blade;
    a pair of bushings, one of which is operatively connected to said first means, and the other of which is operatively connected to said second means; and
    a lamination of a band of filaments including individual, parallel filaments, each of which is coated with an elastomeric substance to separate and hold the parallel alignment of said filaments, said lamination being wrapped around and bonded to said bushings by said elastomeric substance to form between said first and second means a structural link having a longitudinal centerline and side portions, which do not overlap, adapted to have axial strength and torsional resiliency in connecting said blade to said helicopter rotor system, said side portions being held in parallel and contiguous relationship to each other by a plurality of layers of wire wrapped around both side portions over a portion of the length thereof and transverse to the longitudinal centerline of said structural link.

2. In a connecting attachment for joining flexing structures subjected to high tensile stress, a tension-torsion tiebar comprising:
    a pair of bushings having spaced, radially extending flanges;
    a lamination of super-imposed bands including individual wires held in a parallel, non-touching arrangement by an adhesive composition, said lamination enclosing and bonded to said bushings by said adhesive composition to form a solid link having a semi-circular ends joined by non-overlapping side portions, which are parallel over a portion of their length so as to have axial bidirectional strength and torsional resiliency about a longitudinal axis of said lamination, said non-overlapping side portions being held in parallel and contiguous relationship to each other by a plurality of layers of wire wrapped around both side portions over a portion of the length thereof in a direction transverse to the longitudinal axis of said line; and
    a means to connect each of said bushings respectively to said flexing structures on said longitudinal axis.

References Cited

UNITED STATES PATENTS 3,460,628  8/1969  Tankersley _____ 170—160.58

WENDELL E. BURNS, Primary Examiner

U.S. Cl. X.R.

416—114